US011351677B2

(12) United States Patent
Olea

(10) Patent No.: US 11,351,677 B2
(45) Date of Patent: Jun. 7, 2022

(54) MULTI-PAN INSERTION TOOL

(71) Applicant: Oxygen Development LLC, Palm Springs, FL (US)

(72) Inventor: Jeronimo Olea, Boca Raton, FL (US)

(73) Assignee: Oxygen Development LLC, Palm Springs, FL (US)

(*) Notice: Subject to any disclaimer, the term of this patent is extended or adjusted under 35 U.S.C. 154(b) by 0 days.

(21) Appl. No.: 16/912,379

(22) Filed: Jun. 25, 2020

(65) Prior Publication Data

US 2021/0402620 A1 Dec. 30, 2021

(51) Int. Cl.
*B25J 15/06* (2006.01)
*B65B 1/24* (2006.01)
*A45D 33/00* (2006.01)

(52) U.S. Cl.
CPC .............. *B25J 15/06* (2013.01); *A45D 33/00* (2013.01); *B65B 1/24* (2013.01)

(58) Field of Classification Search
CPC .............. B25J 15/06; A45D 33/00; B65B 1/02
USPC ........................................................... 269/21
See application file for complete search history.

(56) References Cited

U.S. PATENT DOCUMENTS

| | | | | | |
|---|---|---|---|---|---|
| 1,431,702 | A | * | 10/1922 | Smend | B66C 1/0212 414/800 |
| 1,741,656 | A | * | 12/1929 | Rolker | A21C 15/00 425/316 |
| 2,731,777 | A | * | 1/1956 | Wollersheim | A45D 33/34 53/436 |
| 2,798,757 | A | * | 7/1957 | Jackson | B65B 23/08 294/184 |
| 2,840,415 | A | * | 6/1958 | Morris | A01K 43/00 294/65 |
| 3,005,652 | A | * | 10/1961 | Helm | B66C 1/0231 294/189 |
| 3,013,833 | A | * | 12/1961 | Gwin | A01K 43/00 294/65 |
| 3,061,352 | A | * | 10/1962 | Hirt | B65B 23/08 294/65 |
| 3,139,300 | A | * | 6/1964 | Hirt | B65B 23/08 294/65 |

(Continued)

*Primary Examiner* — Timothy L Maust
*Assistant Examiner* — James R Hakomaki
(74) *Attorney, Agent, or Firm* — The Concept Law Group, PA; Scott D. Smiley; Scott M. Garrett

(57) ABSTRACT

In the manufacture of certain cosmetics packaging, small metal pans are used to carry the cosmetic material, and these are incorporated in cosmetics carriers. The cosmetic material is initially in a powder form that is compressed into the pan prior to the pan being assembled into a carrier A multi-pan insertion tool includes a control plate and one or more interface plates that can, in turn, be attached to the control plate. Each interface plate corresponds to a different pan configuration. The interface plate includes a plurality of protrusion sites that each correspond to a single pan. An air passage from each protrusion site passes through the tool to the valve on the control plate that is controlled by an operator (either open or closed). A vacuum hose is attached to the valve to create the necessary vacuum/suction. The operator can then use the tool to pick up multiple pans at once, using suction, and then deposit the pans into a press for powder loading and then compression of the powder.

13 Claims, 20 Drawing Sheets

(56) References Cited

U.S. PATENT DOCUMENTS

| | | | | |
|---|---|---|---|---|
| 3,209,923 A * | 10/1965 | Bargel | | B65B 21/20 |
| | | | | 198/432 |
| 3,300,945 A * | 1/1967 | Grossi | | B65B 35/38 |
| | | | | 53/448 |
| 4,019,430 A * | 4/1977 | Warren | | A01K 43/00 |
| | | | | 99/485 |
| 4,091,945 A * | 5/1978 | Patterson | | E04F 21/20 |
| | | | | 414/416.07 |
| 4,316,694 A * | 2/1982 | Martin | | A01G 9/088 |
| | | | | 414/795.6 |
| 4,429,512 A * | 2/1984 | Pegon, Jr. | | B65B 35/46 |
| | | | | 53/246 |
| 4,557,514 A * | 12/1985 | Cushman | | B65G 47/91 |
| | | | | 248/362 |
| 4,625,953 A * | 12/1986 | Hamatani | | B65H 3/0883 |
| | | | | 271/1 |
| 5,133,169 A * | 7/1992 | Tesch, Jr | | B65B 5/068 |
| | | | | 53/247 |
| 5,207,465 A * | 5/1993 | Rich | | B65G 47/917 |
| | | | | 294/2 |
| 5,352,111 A * | 10/1994 | Selbak | | A21B 3/132 |
| | | | | 425/350 |
| 5,572,785 A * | 11/1996 | Tveit | | G02B 7/02 |
| | | | | 29/283 |
| 5,813,420 A * | 9/1998 | Sussman | | A45D 33/006 |
| | | | | 132/294 |
| 6,247,891 B1 * | 6/2001 | Lind | | B01L 9/543 |
| | | | | 269/21 |
| 6,318,777 B1 * | 11/2001 | Tanaka | | H05K 13/0409 |
| | | | | 294/185 |
| 6,498,505 B2 * | 12/2002 | Liao | | G01R 1/0483 |
| | | | | 324/756.01 |
| 9,908,718 B2 * | 3/2018 | Majestic | | B29C 48/07 |
| 10,350,769 B2 * | 7/2019 | Richards | | B65G 47/918 |
| 2003/0047289 A1 * | 3/2003 | Jaussaud | | H01L 31/1896 |
| | | | | 156/758 |
| 2012/0126554 A1 * | 5/2012 | Becker | | A01C 7/04 |
| | | | | 294/64.3 |
| 2013/0147101 A1 * | 6/2013 | Cho | | B65G 47/91 |
| | | | | 269/21 |
| 2015/0232208 A1 * | 8/2015 | Kim | | B65B 39/004 |
| | | | | 141/20.5 |
| 2015/0314424 A1 * | 11/2015 | Kumakura | | B29C 53/18 |
| | | | | 425/388 |

\* cited by examiner

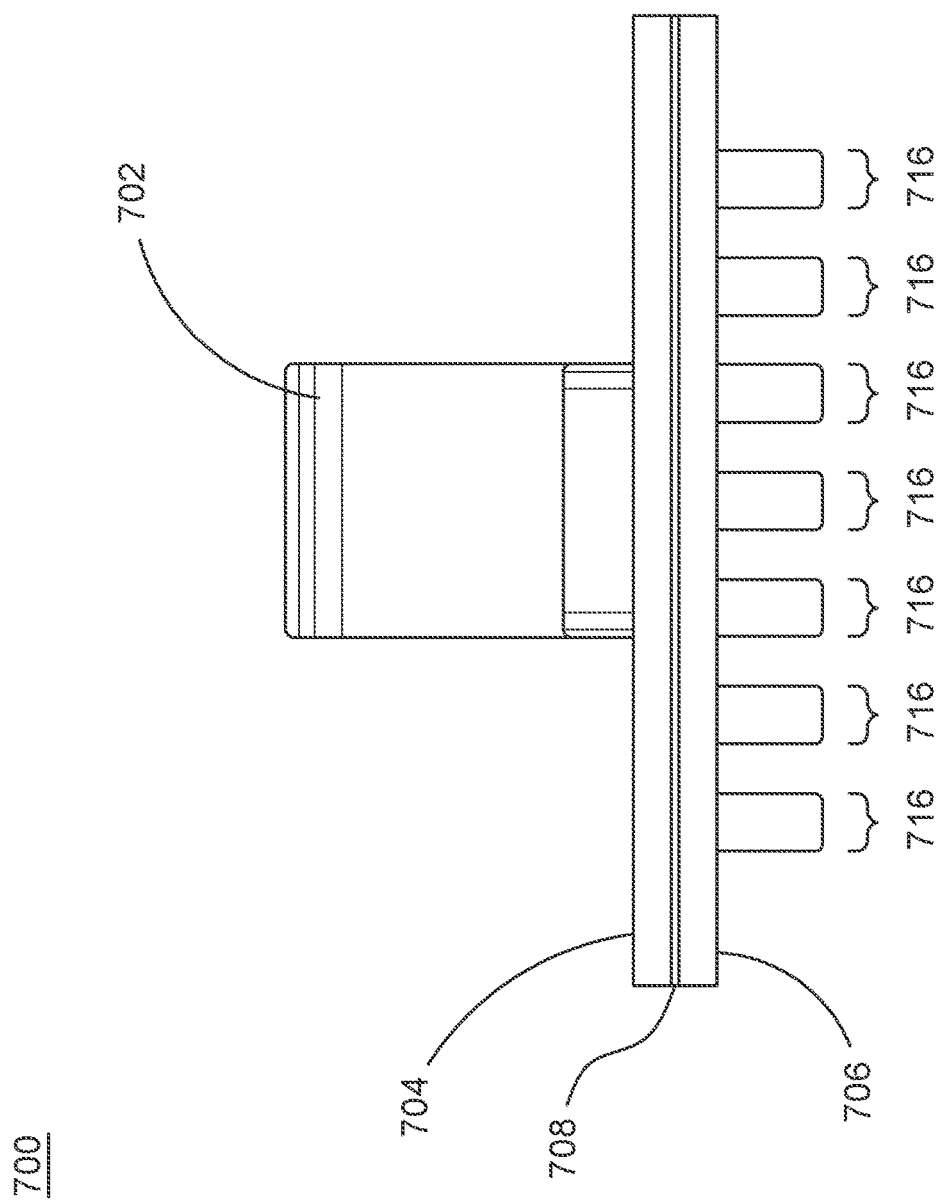

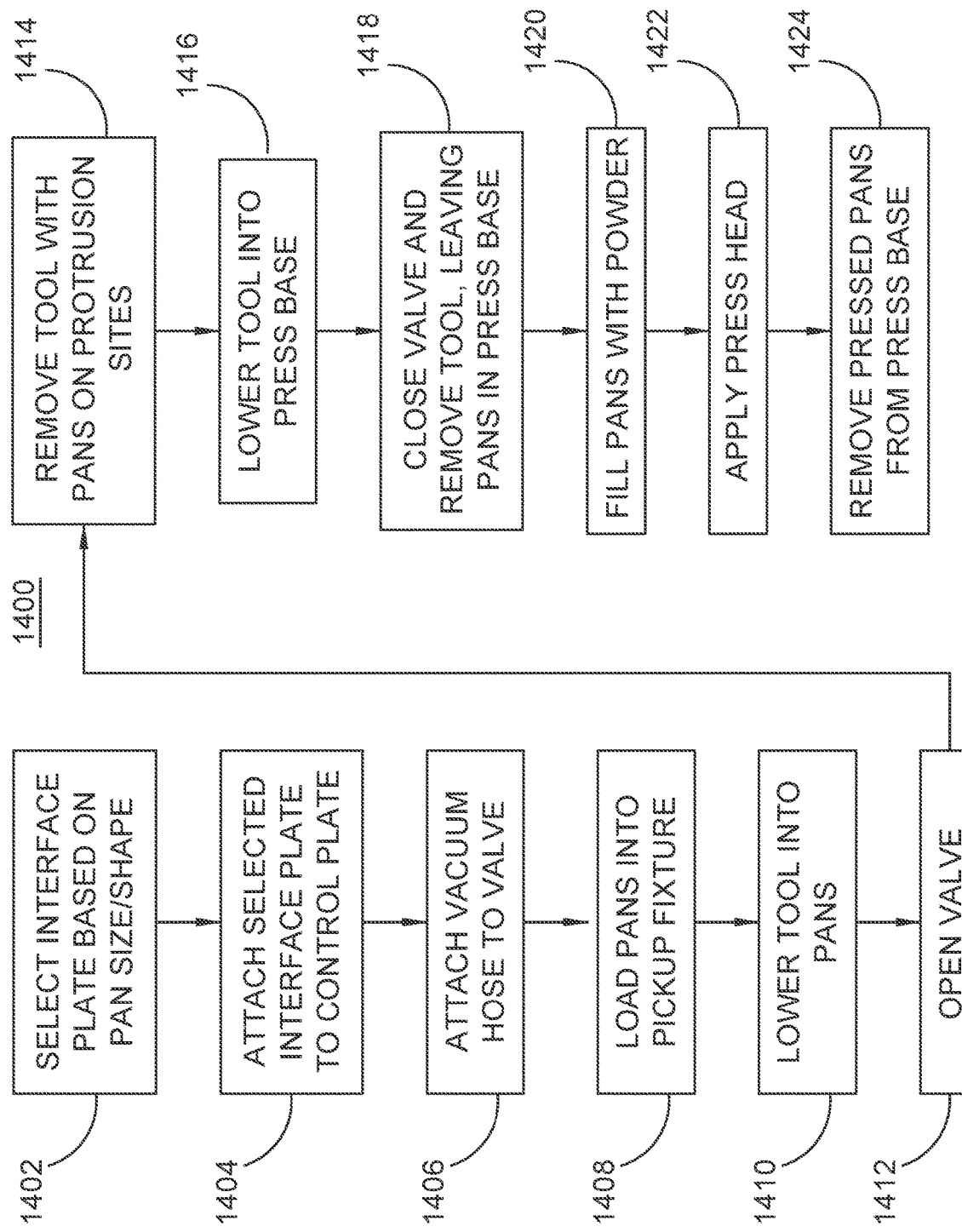

MULTI-PAN INSERTION TOOL

FIELD OF THE INVENTION

The present invention relates generally to manufacturing products using small pans into which a powdered product is pressed, and, more particularly, relates to a tool that uses vacuum to pick up multiple pans and load them into a mold together.

BACKGROUND OF THE INVENTION

In the cosmetics industry it is common to press powdered material into individual products. The material can be used, for example, for eye shadow, blush, and other cosmetic products. Typically, in the manufacturing of these products, small pans are loaded into a press machine, then filled with a powdered product, and a press is applied to compress the powder so that it acts essentially as a unitary solid, rather than a powder. However, unlike a homogenous solid, the product can easily be taken up onto an applicator by simple frictional contact and then applied to a person's face.

Conventionally the loading of pans into a press is done manually to ensure that the pan is both oriented properly and pressed into the supporting fixture that prevents the pan from being crushed or deformed under the pressure of the press. This results in at least two problems. A first problem is that the manual loading of pans into a mold is time consuming. An operator is limited in the number of pans they can move at once, and then they have to align each pan in the mold fixture. This operation limits throughput. Another issue is that the manual movement and loading of pans into a mold fixture is repeated by the operator repetitively, many times, over the course of a shift which can lead to injuries and other longer term occupational issues.

Therefore, a need exists to overcome the problems with the prior art as discussed above.

SUMMARY OF THE INVENTION

The invention provides a multi-pan insertion tool that overcomes the hereinafore-mentioned disadvantages of the heretofore-known devices and methods of this general type and that avoids the problems associated with prior art.

In accordance with some embodiments of the inventive disclosure, there is provided a multi-pan insertion tool that includes a control plate having a first major side and a second major side. The second major side being opposite the first major side and the first major side having a handle mounted thereon. There is further an air channel formed through the control plate from the first major side to the second major side. The tool further includes an interface plate having a first major side and a second major side, where the second major side defines a cavity, and the first major side includes a plurality of protrusion sites that extend outward from the first major side. Each one of the plurality of protrusion sites is configured to fit into a respective pan and hold the respective pan by suction. The interface plate is configured to be coupled to the control plate such that the second major side of the interface plate faces the second major side of the control plate and forms an airtight seal between the interface plate and the control plate, and wherein each the plurality of protrusion sites is in in air flow communication with the cavity and the cavity is in air flow communication with the air channel. The tool further includes an air valve coupled to the air channel on the first major side of the control plate. The air valve has an actuator configured to operate the air valve to thereby allow or disallow air to flow through the air channel.

In accordance with a further feature, the tool can further include an air pump coupled to the air valve that is configured to pump air away from the cavity to create a vacuum suction in the cavity.

In accordance with a further feature, the tool can further a gasket between the control plate and the interface plate.

In accordance with a further feature, the actuator is disposed on the handle.

In accordance with a further feature, the control plate defines a cavity at the second major side that is contiguous with the cavity of the interface plate when the control plate and interface plate are coupled together.

In accordance with a further feature, each one of the plurality of protrusion sites has a perimeter that matches a shape of a specific pan design.

In accordance with a further feature, the control plate and the interface plate each comprise a plurality of corresponding threaded holes, each threaded hole being configured to receive a threaded fastener to join the control plate to the interface plate.

In accordance with a further feature, the plurality of protrusion sites each comprise a protrusion having a bottom that is substantially shaped in correspondence with a pan, and a plurality of openings through the bottom to the cavity.

In accordance with a further feature, the plurality of protrusion sites each include a pair of opposing guide protrusions and a connector boss disposed between the pair of opposing guide protrusions. The pair of opposing guide protrusions are sized and spaced in correspondence with a shape of a specific one of a plurality of different pan shapes.

In accordance with a further feature, the opposing guide protrusion each have an outward-facing "D" profile.

In accordance with a further feature, the tool can further include a suction cup fitting attached to the connector boss, the suction cup fitting including a suction cup at a bottom of the suction cup fitting, and wherein a bottom of the suction cup extends lower than a bottom of each of the opposing guide protrusions.

In accordance with some embodiments of the inventive disclosure there is further provided a multi-pan insertion tool that includes a body having a handle on a top portion of the body and a plurality of protrusion sites on a bottom of the body. Each one of the plurality of protrusion sites is configured to fit into a respective pan and hold the respective pan by suction on a bottom of the body, and each one of the plurality of protrusion sites has an air channel coupled to a common air channel inside the body. The tool further includes a valve coupled to the body and having an air channel in communication with common air channel inside the body. The tool further includes an actuator disposed on the body that controls the valve and is operable to selectively and alternatively open and close the valve.

In accordance with a further feature, the body includes a control plate on which the handle is mounted, and an interface plate on which the plurality of protrusion sites is formed, and wherein the body further includes a gasket between the control plate and the interface plate.

In accordance with a further feature, the control plate and the interface plate each comprise a plurality of corresponding threaded holes, each threaded hole being configured to receive a threaded fastener to join the control plate to the interface plate.

In accordance with a further feature, the actuator is disposed on the handle.

In accordance with a further feature, each one of the plurality of protrusion sites has a perimeter that matches a shape of a specific pan design.

In accordance with a further feature, the plurality of protrusion sites each comprise a protrusion having a bottom that is substantially shaped in correspondence with a pan, and a plurality of openings through the bottom to the common air channel.

In accordance with a further feature, the plurality of protrusion sites each include a pair of opposing guide protrusions, and a connector boss disposed between the pair of opposing guide protrusions. The pair of opposing guide protrusions are sized and spaced in correspondence with a shape of a specific one of a plurality of different pan shapes.

In accordance with a further feature, the pair of opposing guide protrusion each have an outward-facing "D" profile.

In accordance with a further feature, the tool further includes a suction cup fitting attached to the connector boss, the suction cup fitting including a suction cup at a bottom of the suction cup fitting, and wherein a bottom of the suction cup extends lower than a bottom of each of the opposing guide protrusions.

Although the invention is illustrated and described herein as embodied in a multi-pan insertion tool, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the element being discussed. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 7B shows a front side elevational view of the pan insertion tool of FIG. 7A, in accordance with some embodiments;

FIG. 14 is a flowchart diagram of a method for loading pans into a press using a pan insertion tool, in accordance with some embodiments.

DETAILED DESCRIPTION

Figure 1B:
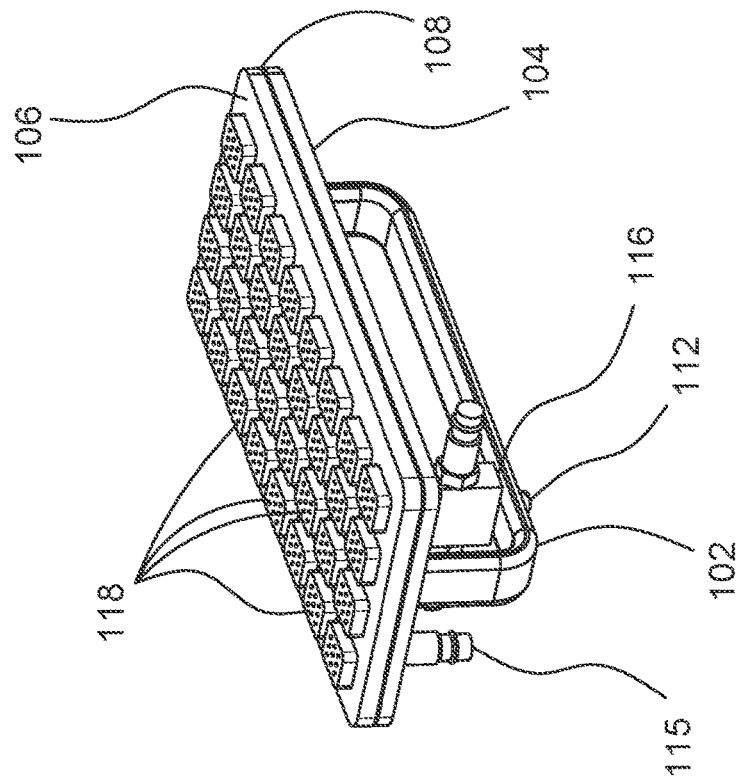
FIG. 1B is a bottom isometric view of a pan insertion tool, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 1A:
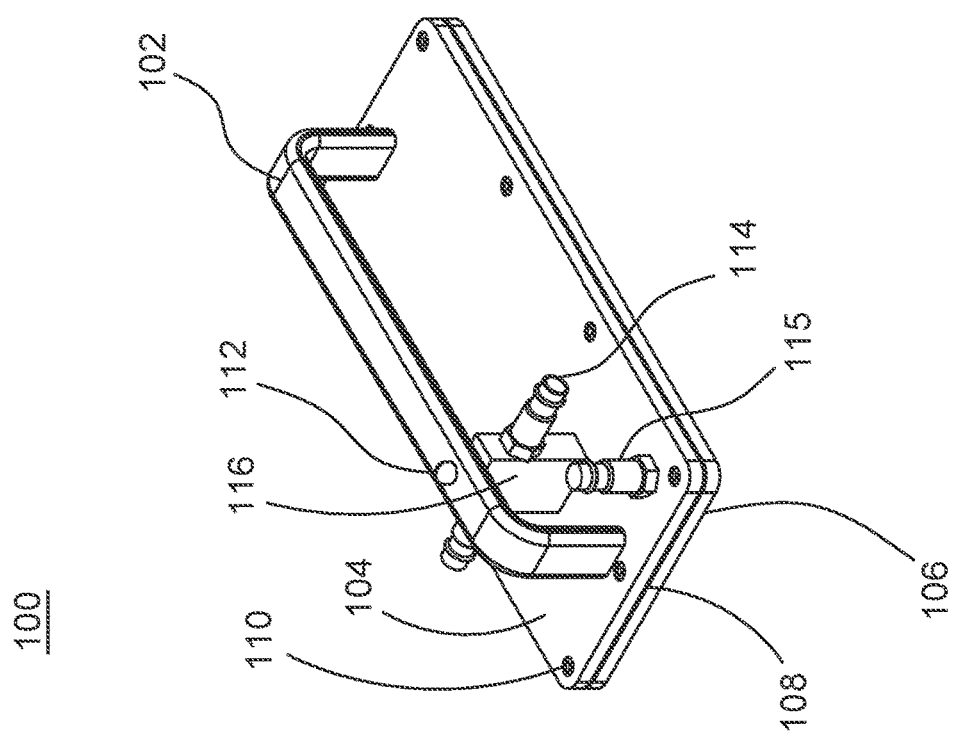
FIG. 1A is a top isometric view of a pan insertion tool, in accordance with some embodiments.

FIG. 1A is a top isometric view of a pan insertion tool 100, and FIG. 1B is a bottom isometric view of the pan insertion tool 100, in accordance with some embodiments. The pan insertion tool is configured, in general, to use an air vacuum or a lower than ambient pressure to pick up multiple pans at once, and load the pans into a press machine. The pans can be cosmetic pans used to contain a cosmetic material. Briefly, after the pans are loaded into the press, they are filled with powdered cosmetic materials that is then pressed and compacted in the pan. The fill and press operation is well known and is not the subject of the inventive disclosure, which is concerned with loading the pans into the press. Furthermore, the pan insertion tool is configured to allow the interface plate, which engages the pans, to be changed, so that different interface plates configured for different pan shapes and sizes can be used with the control plate. So, for example, one interface plate can be configured for use with square pans, while another interface plate can be configured for use with rectangular pans, while still another interface plate can be configured for use with circular pans. Each different interface plate can be swapped out as needed, depending on which pans are being processed.

The pan insertion tool include a body that may be comprised of several parts. As shown here, the body, as assembled includes a handle 102 that is attached to a control plate 104. The side of the control plate 104 on which the handle 102 is attached is a major side, meaning it is much larger than, for example, sides around the edge of the control plate 104. For the purpose of explanation, the maj or side on which the handle 102 is attached to the control plate 104 shall be referred to as a first major side. The control plate 104 has a second major side that is opposite the first major side, and which is inside of the assembled pan insertion tool 100 (and cannot be seen here). The control plate 104 is coupled to an interface plate 106. The control plate 104 can be coupled to the interface plate 106 using a plurality of bolts 110 or similar threaded fasteners, as is known, that pass through corresponding threaded holes are secured with corresponding nuts. A gasket 108 can be placed between the control plate 104 and the interface plate 106 to seal the perimeter between the control plate 104 and the interface plate 106.

The control plate 106 includes an air valve 116 that includes an actuator 112 such as a button or switch to control the flow of air through the valve 116. The actuator 112 control the valve 116 so as to allow an operator to start or stop the flow of air through the valve 116. The actuator 112 that can be located on the handle 102 so that a user can easily operate the actuator 112 with their thumb while grasping the handle 102 with their fingers. The air valve 116 can be further coupled to a hose connector 114 which is configured to couple with an air hose. Thus, air can be drawn through the connector 114 when the valve 116 is opened by the actuator 112. A vacuum can be created directly by a vacuum pump, or by use of a venturi device through which compressed air is passed. The actuator 112 can alternatively be operated to close valve 116, preventing air from being drawn through the valve 116. As will be described in more detail in subsequent drawings, a cavity is formed between the control plate 104 and the interface plate 106, which is surrounded and sealed by the gasket 108. The valve 116 is used to control air flow through the tool via a hose connected to the valve opposite connector 114, that is further connected to connector 115. Connector 115 is attached to the control plate 102 at the first major surface and allows air to pass through the control plate 104, such as through a threaded opening through the control plate 104. Thus, air can be drawn through the control plate 104 through connector 115, as controlled by the valve 116, operated by actuator 112. Connector 114 can be connected to a vacuum pump, which provides force that moves the air through the pan insertion tool 100 as described.

On the interface plate 106, as can be seen in FIG. 1B, there are a plurality of protrusion sites 118 that extend outward from a first major surface (e.g. the bottom) of the interface plate 106. Each of the protrusion sites 118 has a plurality of apertures that are in airflow communication with the cavity inside the pan insertion tool 100, between the control plate 104 and the interface plate 106. Thus, air can be drawn from through the pan insertion tool 100 to create a low pressure at the face of each one of the protrusion sites 118. Each of the protrusion sites 118 is shaped in correspondence with the dimensions of a pan to be picked up and moved by the pan insertion tool 100 into a press.

Figure 1C:
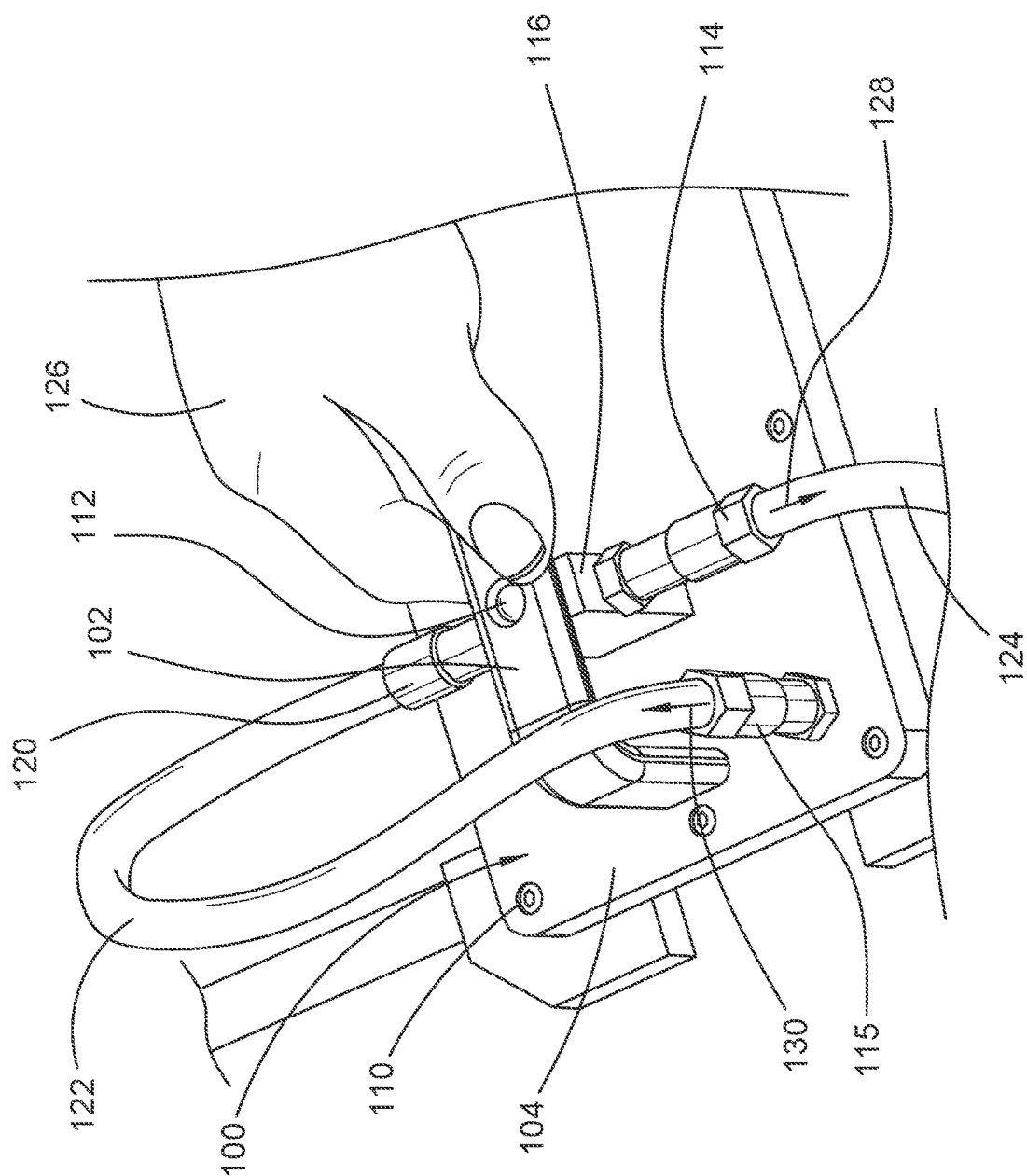
FIG. 1C is a top isometric view of a pan insertion tool set up for use, in accordance with some embodiments.

FIG. 1C is a top isometric view of a pan insertion tool 100 set up for use, in accordance with some embodiments. In this view it can be seen that a first hose 122 is connected to the valve 116 at an inlet connector 120 and to connector 115. A second hose 124 is connected to connector 114, which is an outlet connector. A user's hand 126 can grasp the handle 102 and operate the actuator 112 (shown here as a switch) to open or close the valve 116. Then the valve 116 is open, air is drawn through connector 115 and first hose 128 as indicated by arrow 130. The air is further drawn through the valve 116 and hose 124 as indicated by arrow 128. As a result, air is drawn through the openings in the bottom of each of the protrusion sites 118 to create a suction which is used to hold a pan on the bottom of each protrusion site 118. When engaging pans, the pans block the flow of air, creating a vacuum inside the pan insertion tool 100, which results in a pressure differential that holds each pan to its respective engaging protrusion sites 118. When the operator moves the pans into the press, the user can then close the valve 116 by toggling the actuator 112, ceasing the vacuum, and allowing the pans to disengage from the pan insertion tool 100. In alternative arrangement, the valve 116 can be configured to have its inlet coupled through the control plate 104 in the way that connector 115 is shown here, eliminating the need for first hose 122 and connector 115.

Figure 2:
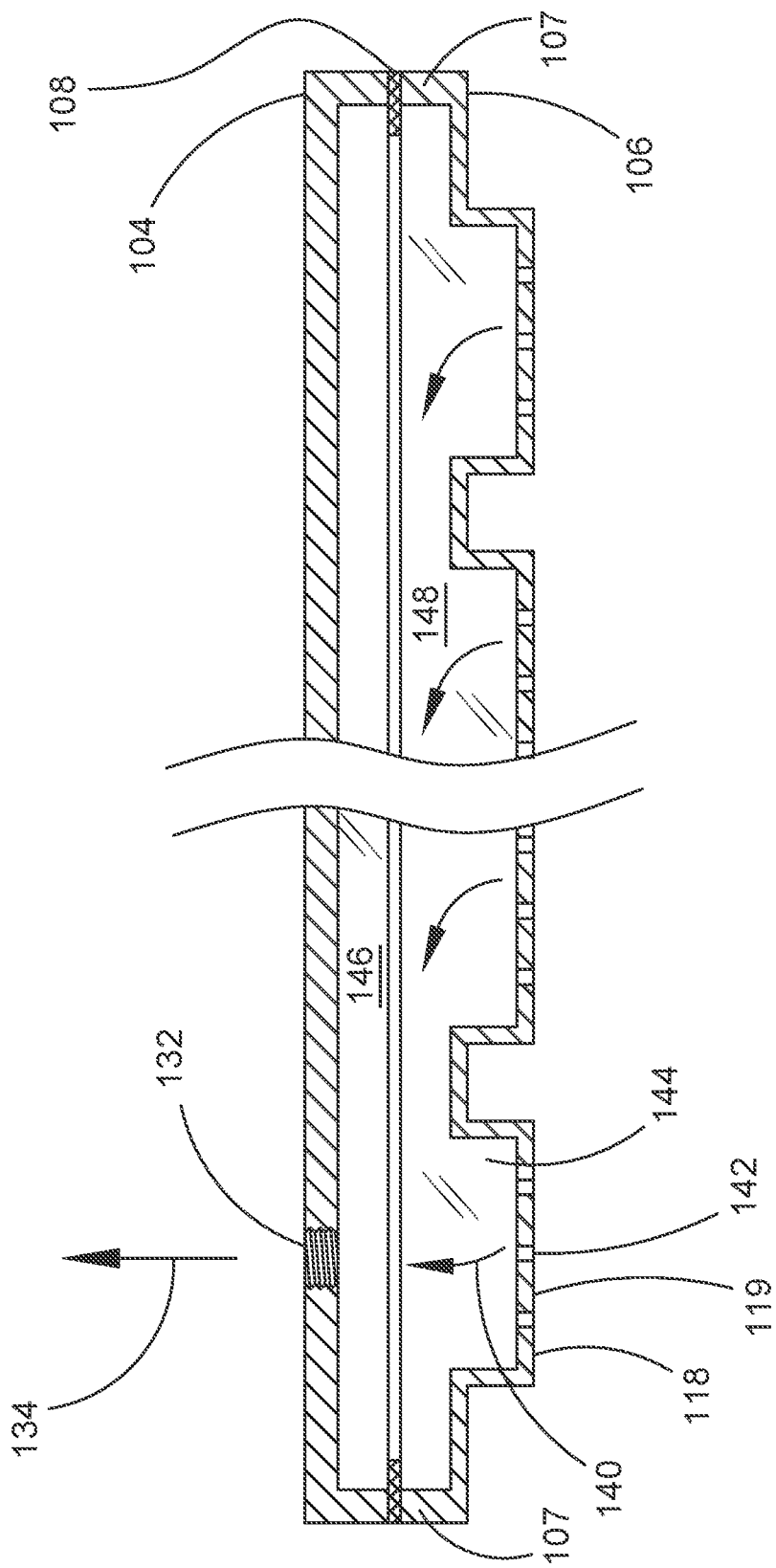
FIG. 2 is a side cut-away view of an assembled pan insertion tool, in accordance with some embodiments.

FIG. 2 is a side cut-away view of an assembled pan insertion tool 100, in accordance with some embodiments. In this view it can be seen that the control plate 104 is coupled to the interface plate 106 with a gasket 108 between them. The gasket 108 ensures an airtight seal between the control plate 104 and the interface plate 106. Further, it can be seen that the interface plate 106 defines a cavity 148 at its second major surface (e.g. the side facing the control plate 104). The cavity 148 is contiguous with cavity portions formed by each protrusion 118 to allow air to flow from the protrusions 118 into the cavity 148. The protrusion sites 118 are arranged in a matrix or grid, and are each sized and dimensioned to fit within a pan without binding so that the pan can be released. However, the protrusion sites 118 are further sized and dimensioned so as to ensure each pan is properly oriented for insertion into the press. Each protrusion site 118 has a plurality of holes or perforations 142 in air flow communication with the cavity 148 the body that allow air to pass through the protrusion site 118 into the cavity 148, and will create a low pressure at the outside surface 119 of the protrusions 118. The cavity 148 is formed by a wall 107 that surrounds the cavity 148 around the perimeter of the interface plate 106. In some embodiments a similar cavity 146 can be formed in the control plate 104 at the second major surface. The cavities 146, 148 also serve to lighten the pan insertion tool 100.

A common air channel 132 is coupled to the valve 116 to allow air to flow out of the pan insertion tool as indicated by arrow 134. Air flows to the air channel 132 from the protrusions 118 as indicated by the solid line arrows 140. The air channel 132 can be directly connected to the valve 116, or to a connector (e.g. 115) that that is coupled to the valve 116 via a hose (e.g. 122). In operation the pan insertion tool 100 is operated by connecting a vacuum pump to the hose connector 114 to create a vacuum. The vacuum pump is configured to draw or pump air of the cavity 148 and through the openings 142 at the protrusion sites 118, which are sized and shaped to fit into respective pans. The resulting suction lifts each pan onto a respective protrusion, and is held there while the operator of the tool 100 has the valve opened. When the tool 100 is in position over a press, the pans can be inserted into respective pan receptacles that are arranged in a pattern corresponding to the protrusion sites 118. The benefit of having the interface plate 106 attach to the control plate 104 is that different interface plates can be used with the control plate 104. Thus, different interface plates can be created for different shaped/sized pans.

Figure 3:
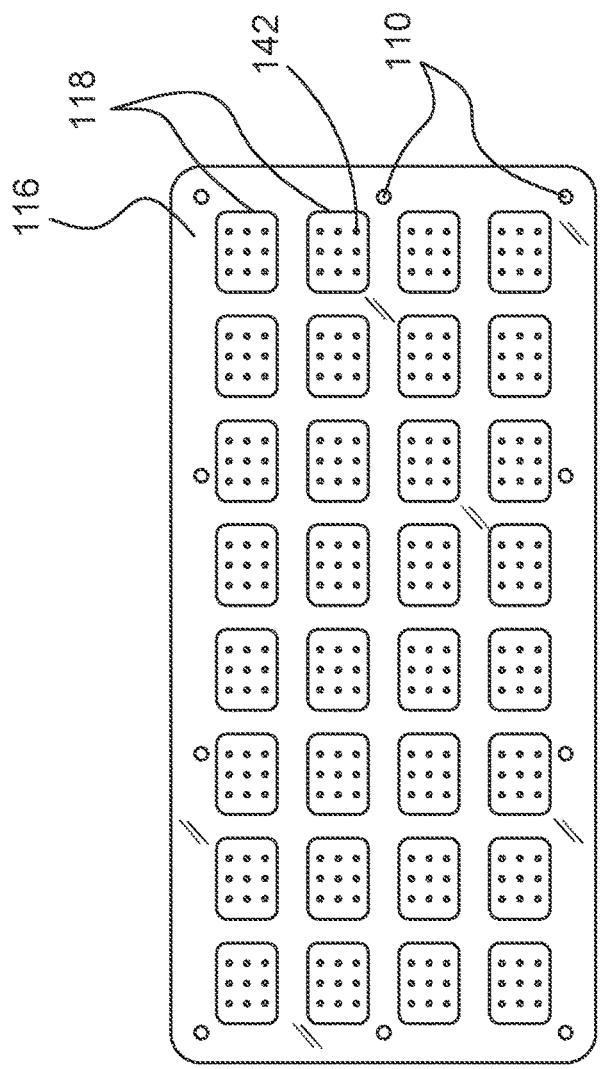
FIG. 3 is a bottom plan view of an interface plate, in accordance with some embodiments.
Figure 3:
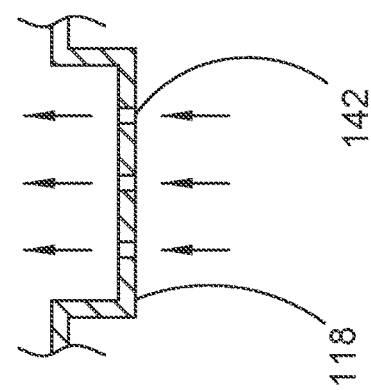

FIG. 3 is a bottom plan view of an interface plate 106, in accordance with some embodiments. Specifically, the side in view here forms the bottom of the pan insertion tool 100. Inset view 200 is a cross sectional view of a protrusion 118 showing the openings 142 with arrows indicating the direction of air, or suction force when the protrusion face is covered by a pan. As can be seen, the specific interface plate 106 shown has a pattern of four by eight roughly square faced protrusion sites 118, with each protrusion site 118 having a three by three arrangement of openings 142. Other arrangements can be designed and used for differently shaped pans. For example the protrusion sites 118 can have a circular plan configuration, or an oval plan configuration, and so on. The protrusion sites 118 extend outward from the interface plate 106 by a distance that allows the face of the protrusion sites 118 to meet the bottom of the pan it is designed to lift and carry.

Figure 4:
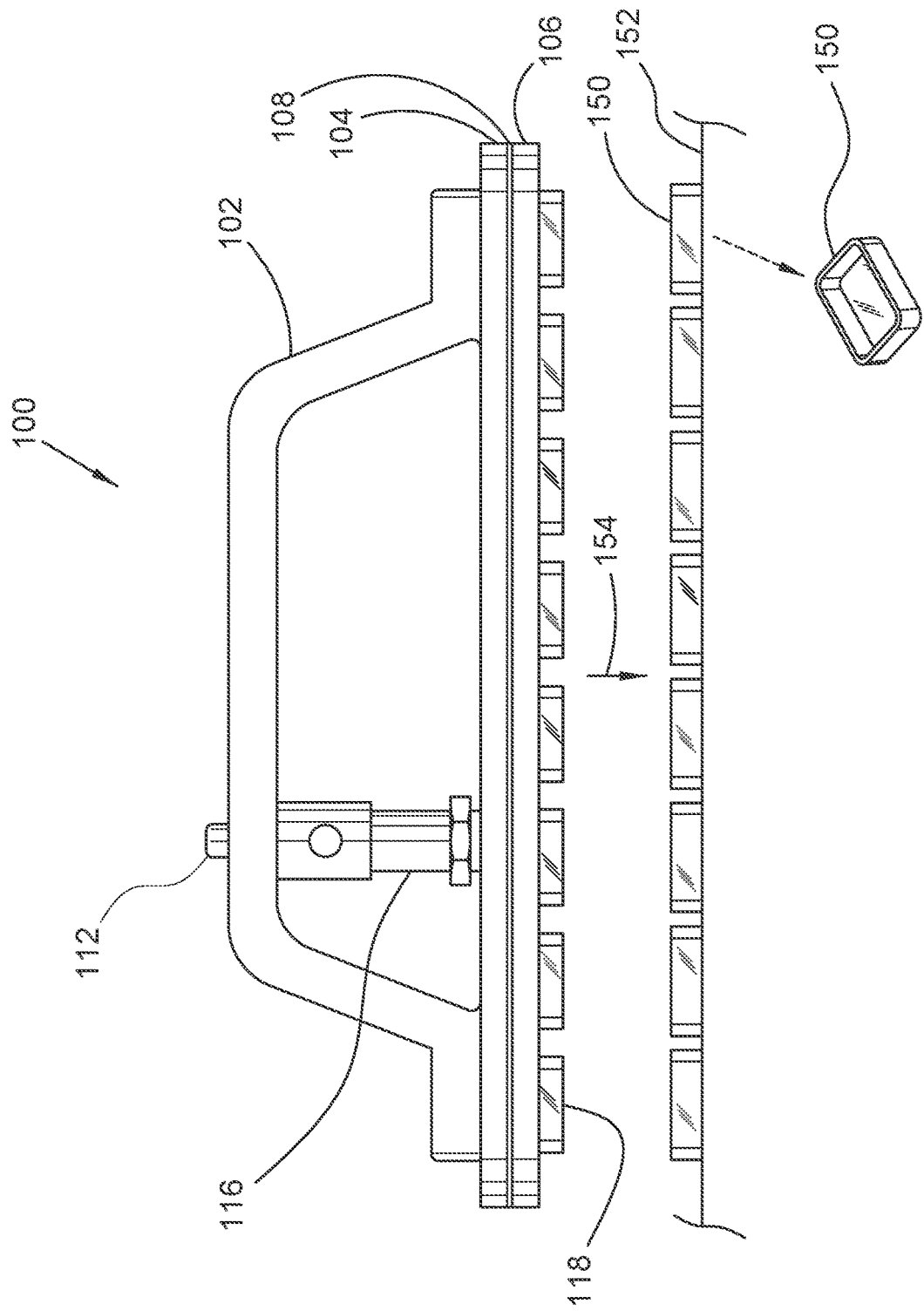
FIG. 4 is a side view of a pan insertion tool and a plurality of pans to be picked up with the pan insertion tool, in accordance with some embodiments.
Figure 5:
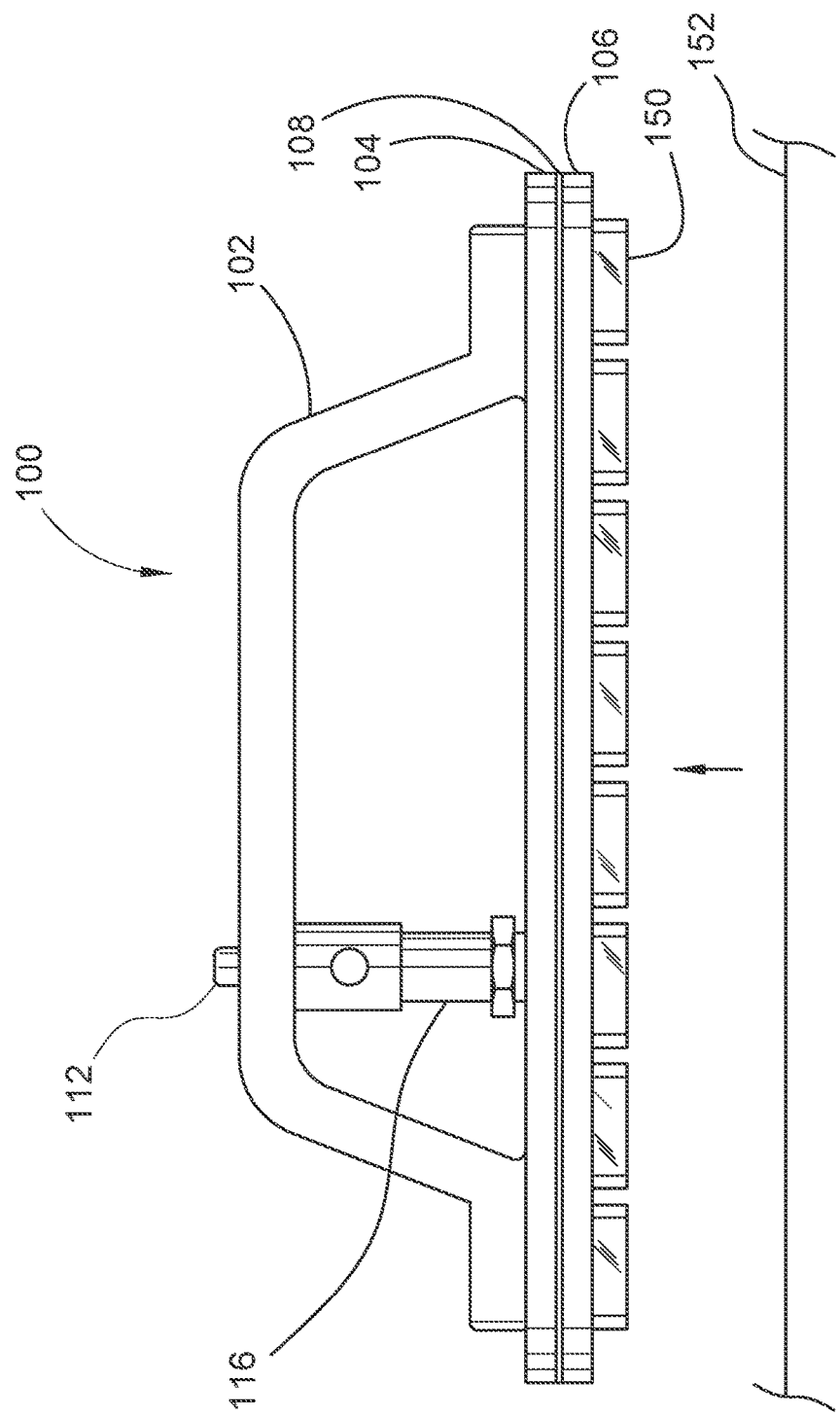
FIG. 5 is a side view of a pan insertion tool and a plurality of pans that have been picked up with the pan insertion tool, in accordance with some embodiments.

FIG. 4 is a front view of a pan insertion tool 100 and a plurality of pans 150 to be picked up with the pan insertion tool, and FIG. 5 shows the pans 150 after they have been picked up, prior to being placed into a press, in accordance with some embodiments. In FIG. 4, the pan insertion tool 100 is lowered, as indicated by arrow 154, over a plurality of pans 150. The pans 150 are on a surface 152 such as a pan carrier that holds the pans 150 in an arrangement that is the same as the arrangement of protrusion sites 118 on the bottom of the pan insertion tool 100. Once the protrusion sites 118 are seated in their respective pans 150, the operator can operate the actuator 112 to open the valve 116 to draw air through the pan insertion tool 100, creating a suction at the face of each of the protrusion sites 118, and between the protrusion sites 118 and each respective pan 150. More specifically, the operator lowers the tool 100 so that the protrusion sites 118 are each located in a respective pan 150 while the valve 116 is closed. Then the operator opens the valve 116 using actuator 112 to create the suction at the interface of the protrusion sites 118 and each pan 150, resulting in a force sufficient to hold each pan 150 onto its respective protrusion site 118. Then, as indicated in FIG. 5, the pans can be lifted and to a press where they can be placed in pan receptacles that are arranged in the same pattern as the protrusion sites 118.

Figure 6:
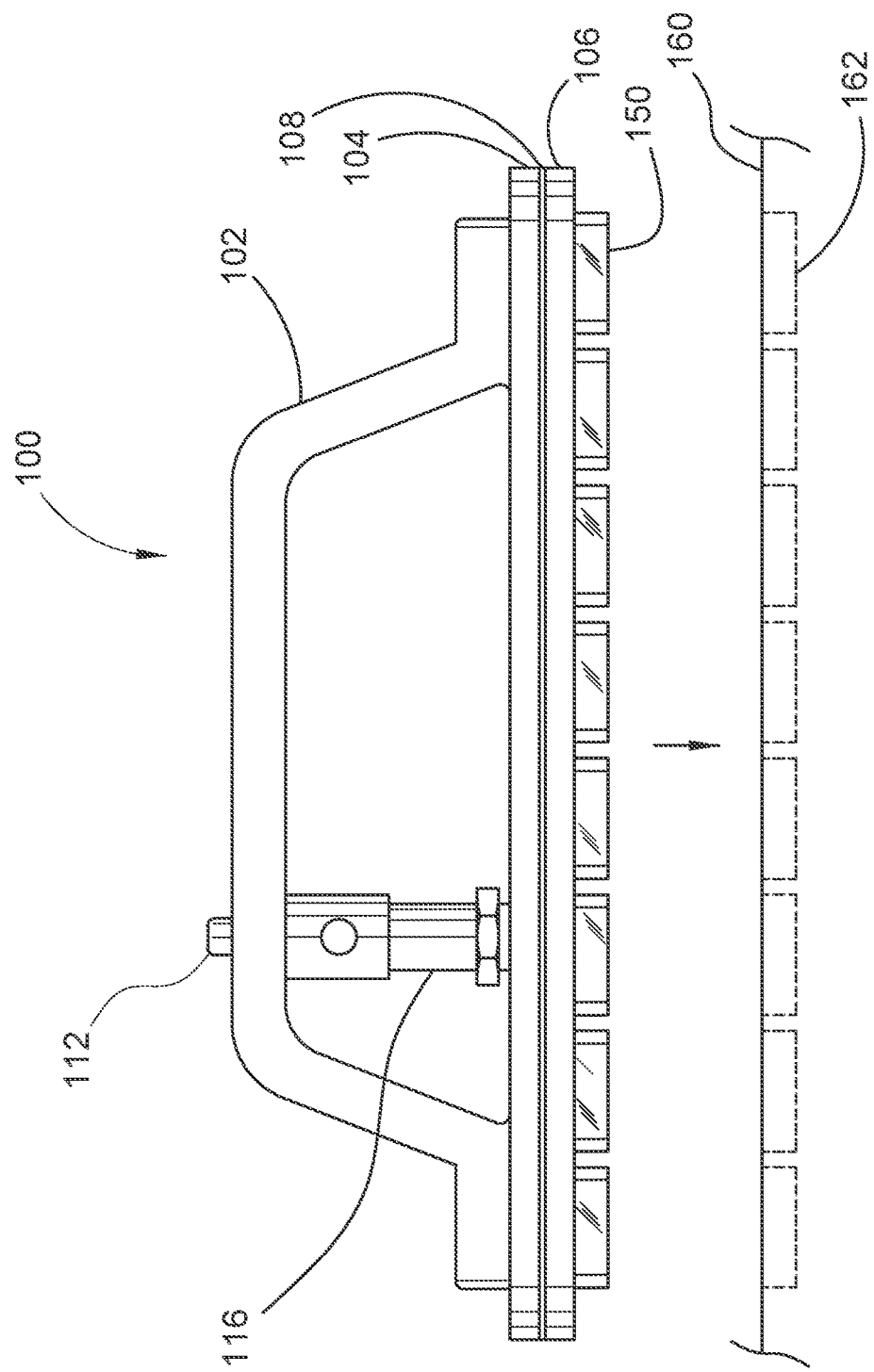
FIG. 6 is a side view of a pan insertion tool and a plurality of pans that have been picked up with the pan insertion tool and that are being loaded into a press, in accordance with some embodiments.

FIG. 6 is a side view of a pan insertion tool 100 and a plurality of pans 150 that have been picked up with the pan insertion tool 100, using suction, and that are being loaded into a press 160. The press 160 includes a fixture that provides a plurality of pan receptacles 162 that are sized and arranged to each hold one of the pans 150. Once the pans 150 are seated in the pan receptacles, the operator can close the valve by operation of the actuator 112, thereby ceasing the suction force between the protrusion sites 118 and the pans 150, and lift the pan insertion tool 100 out of the press, leaving the pans 150 in the press for filling and compaction.

Figure 7A:
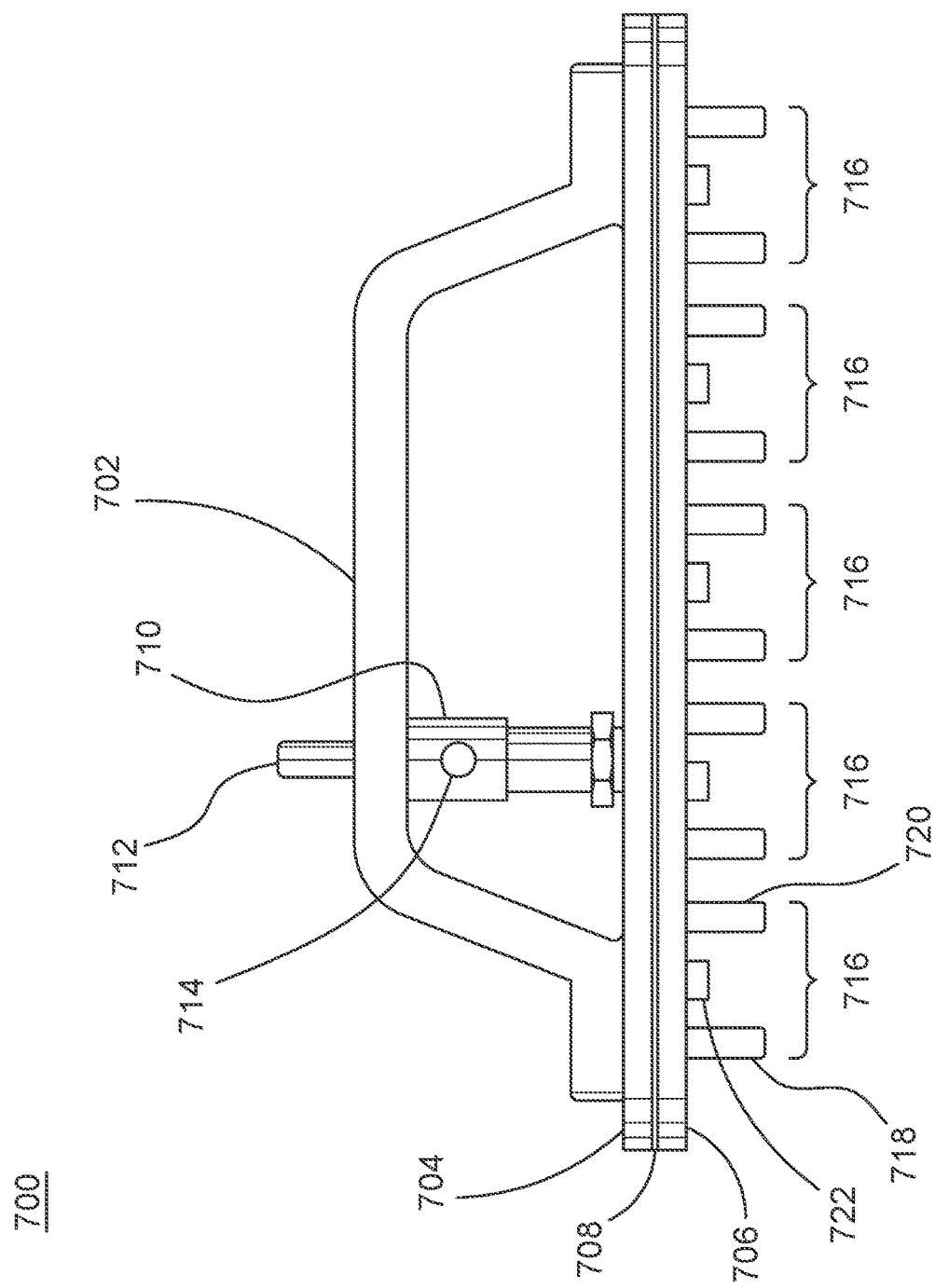
FIG. 7A shows a left/right side elevational view of a pan insertion tool, in accordance with some embodiments.
Figure 7C:
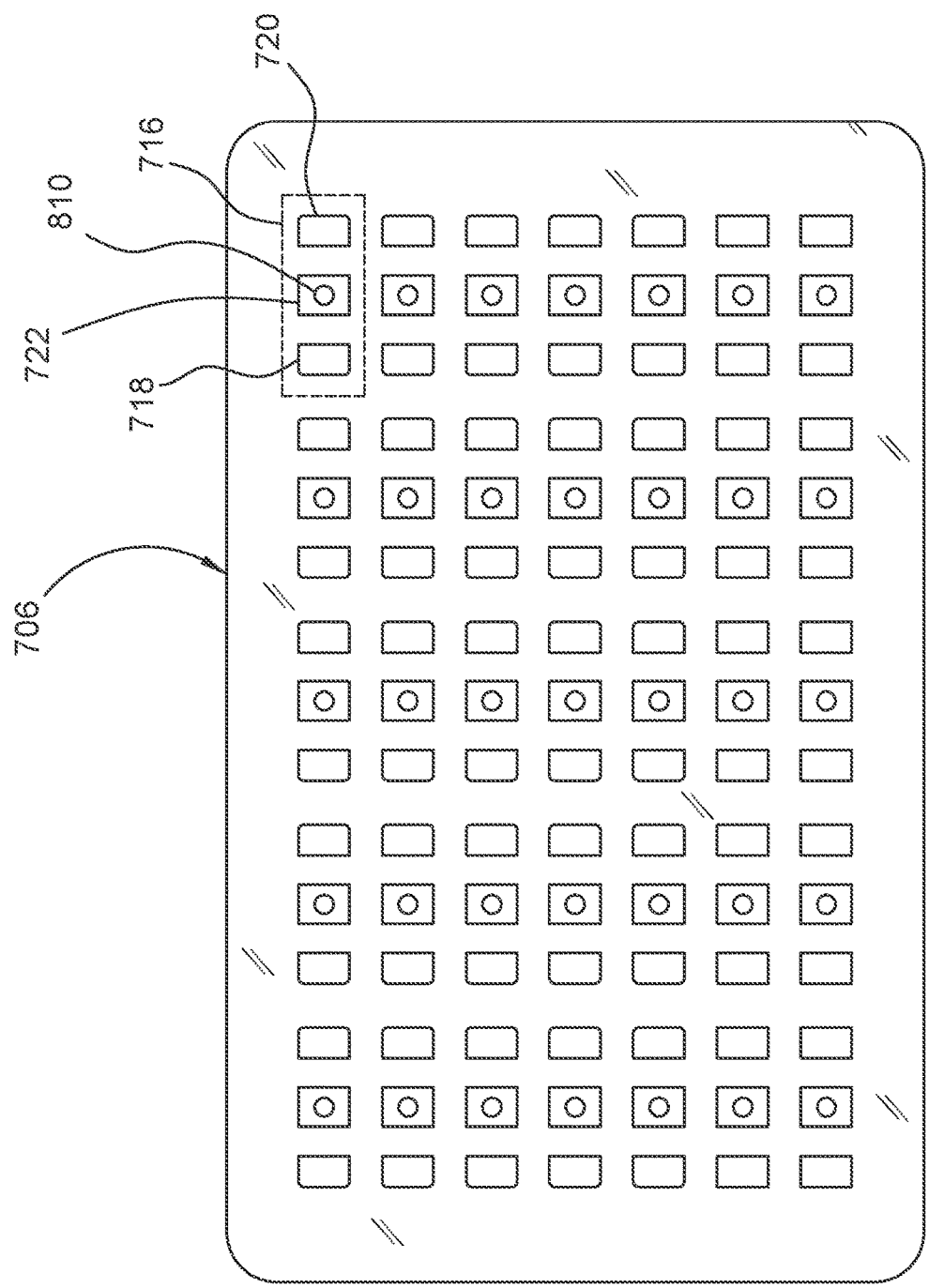
FIG. 7C shows a bottom view of an interface plate including a plurality of protrusion sites, in accordance with some embodiments.

FIG. 7A shows a side elevational view of a pan insertion tool 700, in accordance with some embodiments. FIG. 7B shows front side elevational view of the pan insertion tool 700. The pan insertion tool 700 is substantially similar to the embodiments represented by the tool 100 shown in the preceding drawings, and includes a handle 702 on a control plate 704. The control plate 704 is coupled to an interface plate 706 with a gasket 708 between the control plate 704 and the interface plate 706. A valve 710 is operated by an actuator 712 and is coupled to the interface plate 704 through a connector 714. An airway is defined through the control plate 704, connector 714, and valve 710 that can be opened or closed by the valve 710 in response to operation of the actuator 712. The interface plate 706 includes a plurality of protrusion sites 716 that each have three particular features, including a pair of opposing guide protrusions 718, 720, and a connector boss 722. The opposing guide protrusions 718, 720 at each protrusion site 716 are sized and spaced apart from each other so as to fit into a pan at opposing sides of the pan. FIG. 7C shows a bottom view of an interface plate 706 including a plurality of protrusion sites, with one protrusion site 716 specifically shown in accordance with FIGS. 7A and 7B.

Figure 7D:
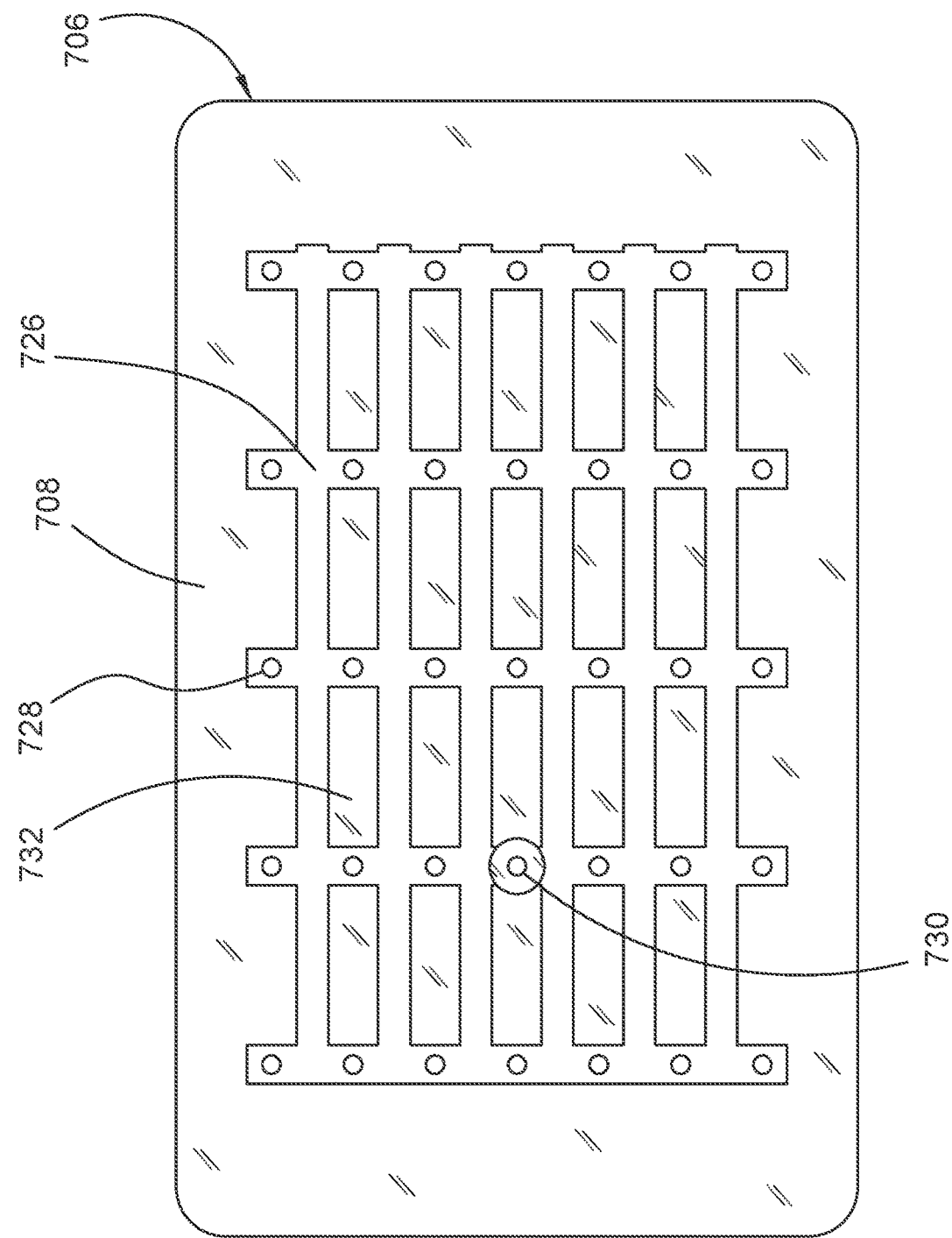
FIG. 7D shows the top surface of an interface plate, in accordance with some embodiments.

FIG. 7D shows the top of the interface plate 706 with the air channels 726 exposed. The air channels form the cavity or passageway through which air flows or in which the vacuum is communicated. The gasket 708 is shown on top of the interface plate 706 to show how is surrounds the cavity created by the air channels 726. The air channels 726 connect to through holes 728 at the location of each connector boss on the bottom of the interface plate. To minimize the volume of air in the channels, islands 732 can be left that extend up higher than the floor of the channels 726. Location 730 indicates where the connector to the air valve resides, and the islands in that region may be relieved (cut back) to allow the end of the connector to protrude slight into the channel at that location. Accordingly, once coupled to the bottom of the control plate 704 air can be drawn from each hole 728, through the channels 726 and through the valve to create a vacuum that holds the pans to the protrusion sites.

Figure 8:
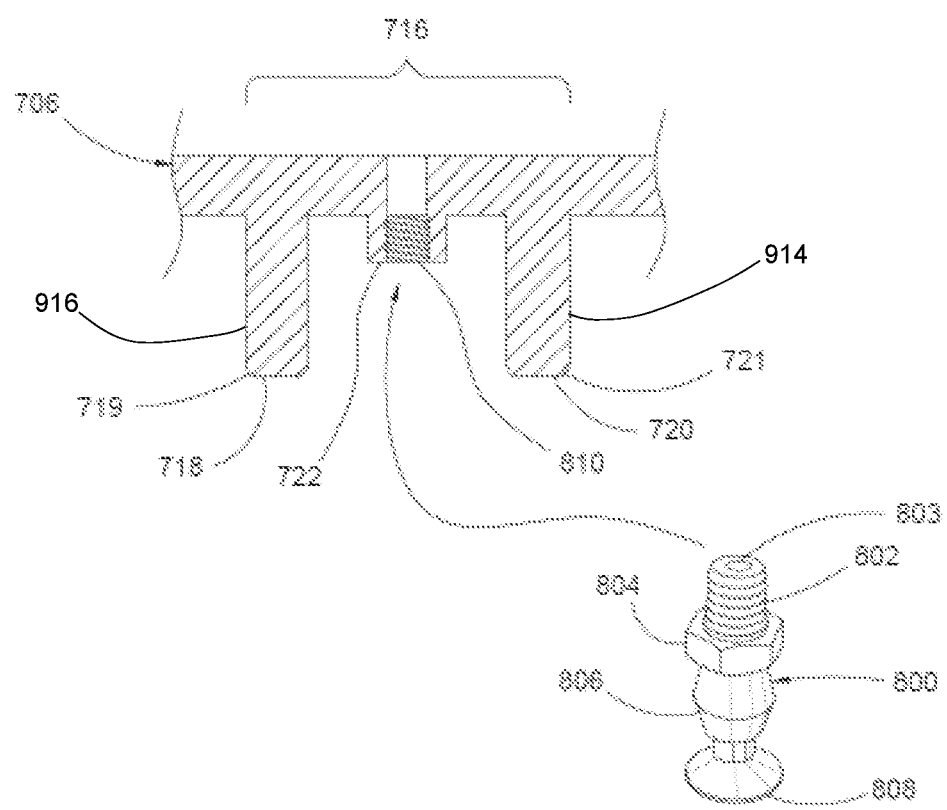
FIG. 8 shows a detail of a protrusion site of a pan insertion tool for receiving and holding a pan, in accordance with some embodiments.
Figure 12:
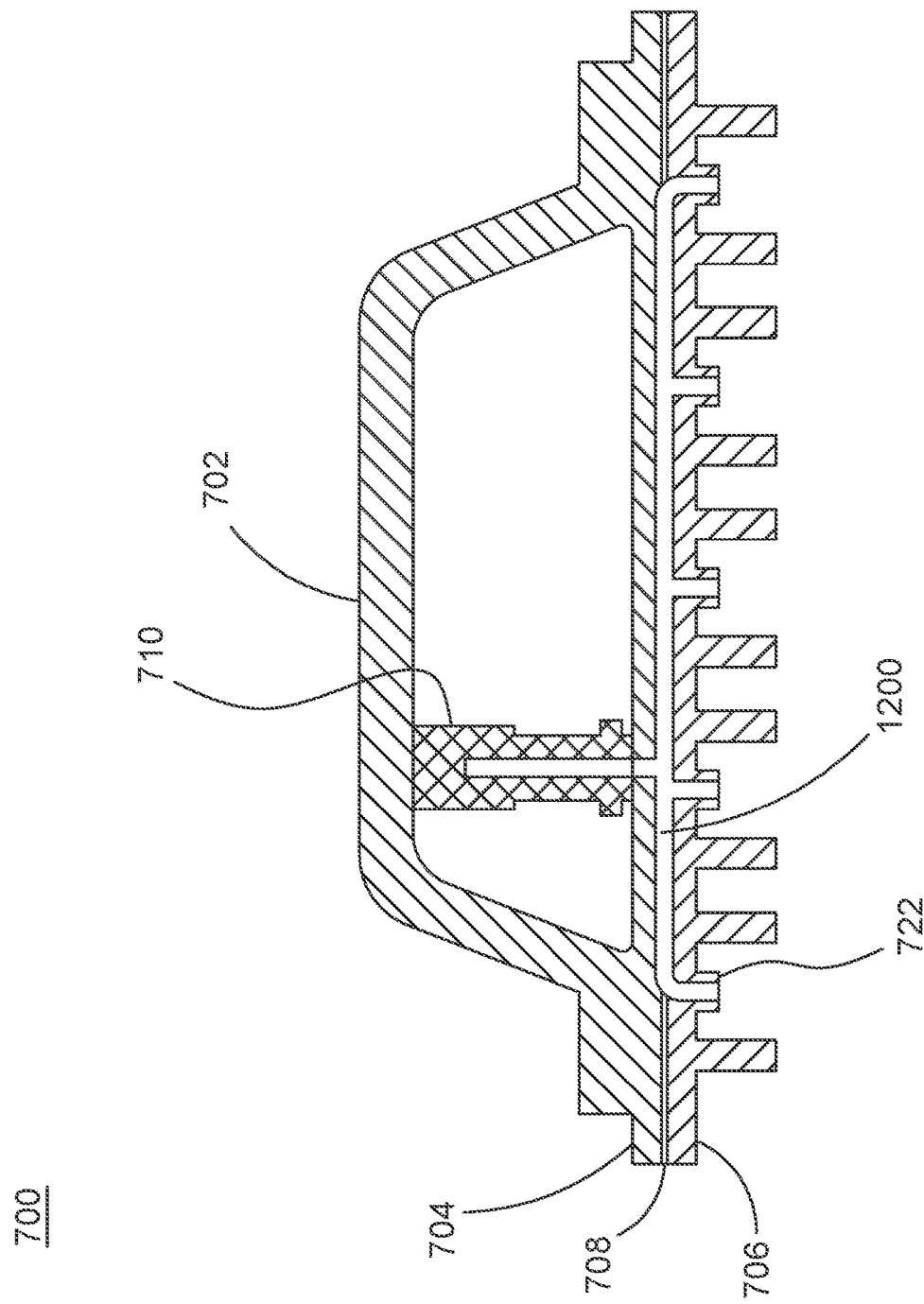
FIG. 12 is a side cut-away view of a pan insertion tool, in accordance with some embodiments.

FIG. 8 shows a detail of a protrusion site 716 of a pan insertion tool 700 for receiving and holding a pan. The connector boss 722 includes a threaded through hole 810 that connects to the airway cavity inside of the tool 700. A suction cup fitting 800 includes a threaded top portion 802 that threads into the threaded through hole 810. A nut portion 804 can assist in threading or unthreading the suction cup fitting 800 into or out of the connector boss 722. The suction cup fitting 800 can further include a standoff portion 806 that extends from the nut portion 804 and/or top portion 802. At the bottom of the standoff portion 806 is a suction cup 808 that includes a passageway through the suction cup that is in communication with a passageway 803 through the suction cup fitting 800 to allow air to pass through the suction cup fitting 800. The suction cup 808 is made of a resilient material, such as rubber, that allows the cup portion to flex and return to its original shape, having a spring action. Accordingly, when the suction is removed by closing the valve, the spring action of the suction cup can urge the pan off of the guide protrusions 718, 720 located at each protrusion site. Further, here it can be seen that the outer lower edges 719, 721 where the outer vertical surfaces 916, 914 meet the bottom of each of the guide protrusions 718, 720, respectively, are rounded. FIG. 12 shows a side cut-away view of the pan insertion tool 700, wherein the cavity or passageways 1200 inside the tool provide air flow from each connector boss 722 to the valve 710. A suction hose can be attached to the valve 710 to allow an operator to turn on or turn off suction to the each of the suction cups 808.

Figure 9:
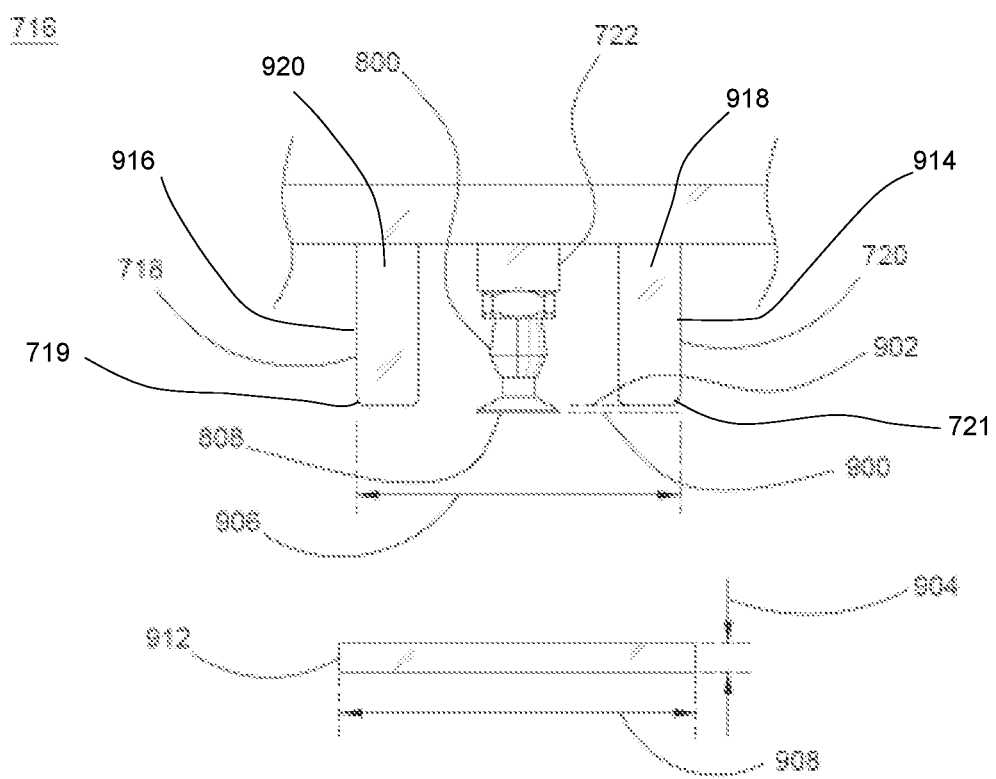
FIG. 9 shows a detail of an assembled protrusion site of a pan insertion tool for receiving and holding a pan, in accordance with some embodiments.
Figure 10:
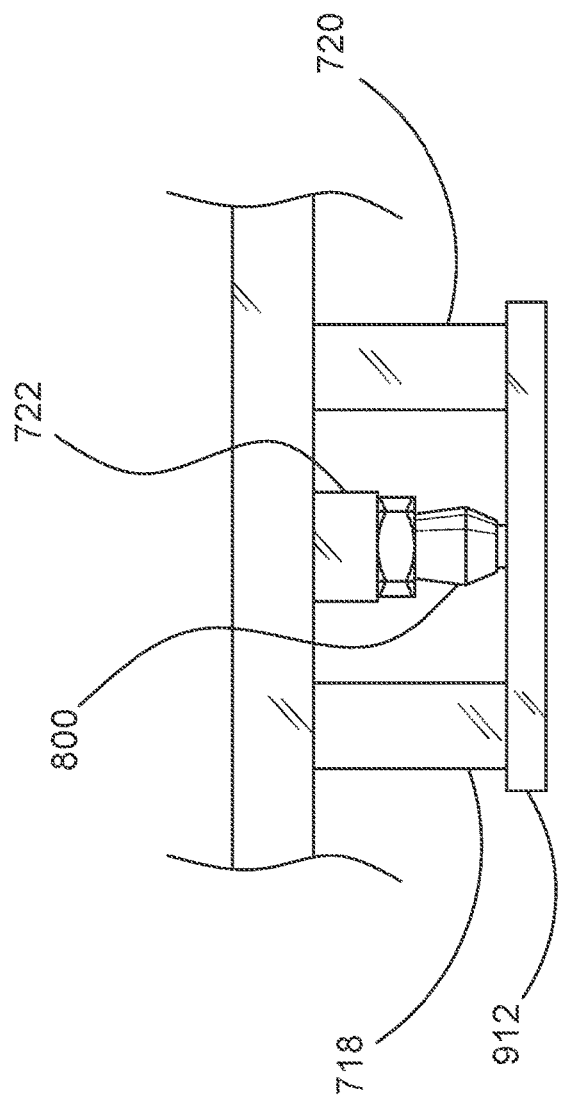
FIG. 10 shows a detail of an assemble protrusion site of a pan insertion tool upon picking up a pan, in accordance with some embodiments.
Figure 11:
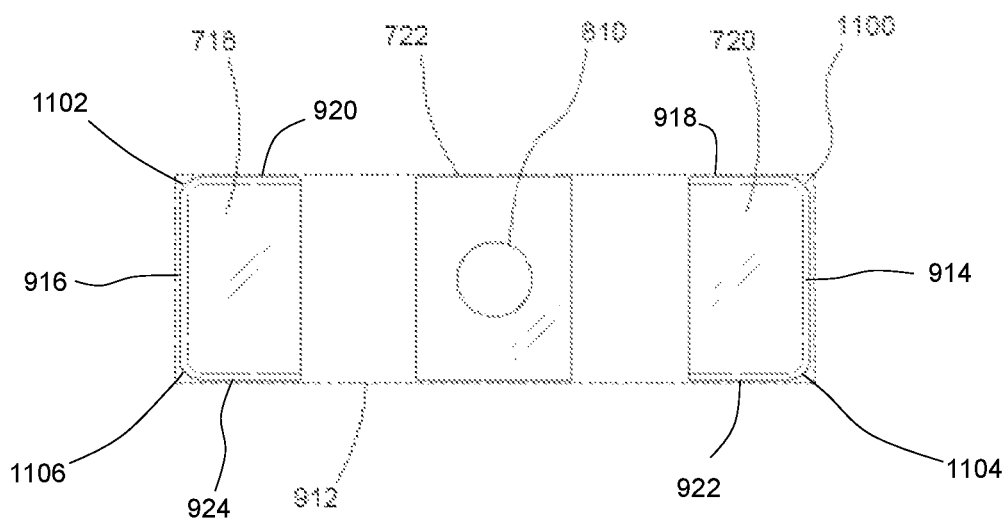
FIG. 11 shows a bottom view of a protrusion site of a pan insertion tool having an outline of a pan superimposed over the protrusion site, in accordance with some embodiments.

FIG. 9 shows a detail of an assembled protrusion site 716 of a pan insertion tool 700 for receiving and holding a pan 912, in accordance with some embodiments. Once assembled, the bottom of the suction cup 808 extends downward to a position 900 that is slightly below the bottom position 902 of the opposing guide protrusions 718, 720. However, the distance between the bottom of the suction cup 808 and the bottom of the guide protrusions 718, 720 is less than an internal height 904 of the pan 912. The distance 906 between the outsides of the guide protrusions 718, 720 is slightly less than the internal width 908 of the pan, while the depth (into the page) of the guide protrusions 718, 720 is slight less than the internal depth (again, into the page) of the pan 912. Accordingly, when the tool 700 is lowered over the pan 912, assuming proper alignment, the bottom of the suction cup 808 makes contact with the inner surface of the bottom side of the pan 912 and begins to deflect as the tool is lowered further into the pan 912 until the bottoms of the guide protrusions 718, 720 then make contact with the inner surface of the bottom of the pan 912. At which point, the operator opens the valve 710, creating a suction under the suction cup 808, between the suction cup 808 and the pan 912, creating a force that holds the pan onto the protrusion site 716, as shown in FIG. 10. FIG. 11 shows a bottom view protrusion site 716 with the outline of the internal cavity dimensions of a pan 912 shown superimposed over the guide protrusions 718, 720. Each of the guide protrusions 718, 720 have an outer vertical surface 916, 914, respectively that face outward or away from the other guide protrusion 718, 720. In addition, each of the guide protrusions 718, 720 have side vertical surfaces 920, 918, respectively (and 924, 922 as shown in FIG. 11). Here it can be seen that the guide protrusions 718, 720 have an outward-facing "D" profile, with rounded outer corners 1100, 1102, 1104, 1106 where the side vertical surfaces 920, 924 of guide protrusion 718 meet outer vertical surface 916, and where side vertical surfaces 918, 922 of guide protrusion 720 meet outer vertical surface 914. In addition to the rounded lower outer edges 719, 721, the rounded outer corners 1100, 1102, 1104, 1106 prevent interference from occurring with the pans when lowering the tool into the pans. Since pans can vary in dimensions due to tolerances, these rounded features allow for varying dimensional tolerances of the pans, while the sides of the guide protrusions can prevent the pans from turning too much by bearing against the inner sides of the walls of the pan if some force acts on the pan tending to cause it to turn.

Figure 13B:
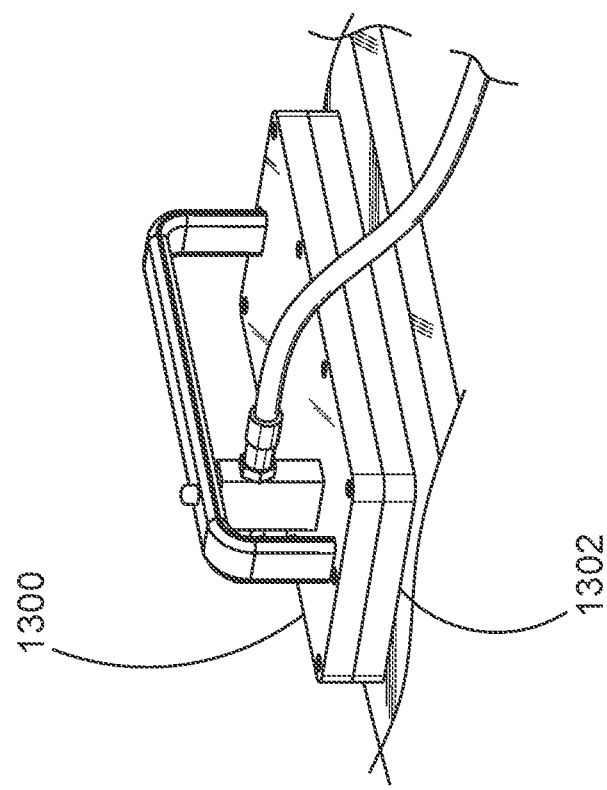
FIGS. 13A-13F show a process for loading pans into a press using a pan insertion tool, in accordance with some embodiments.
Figure 13A:
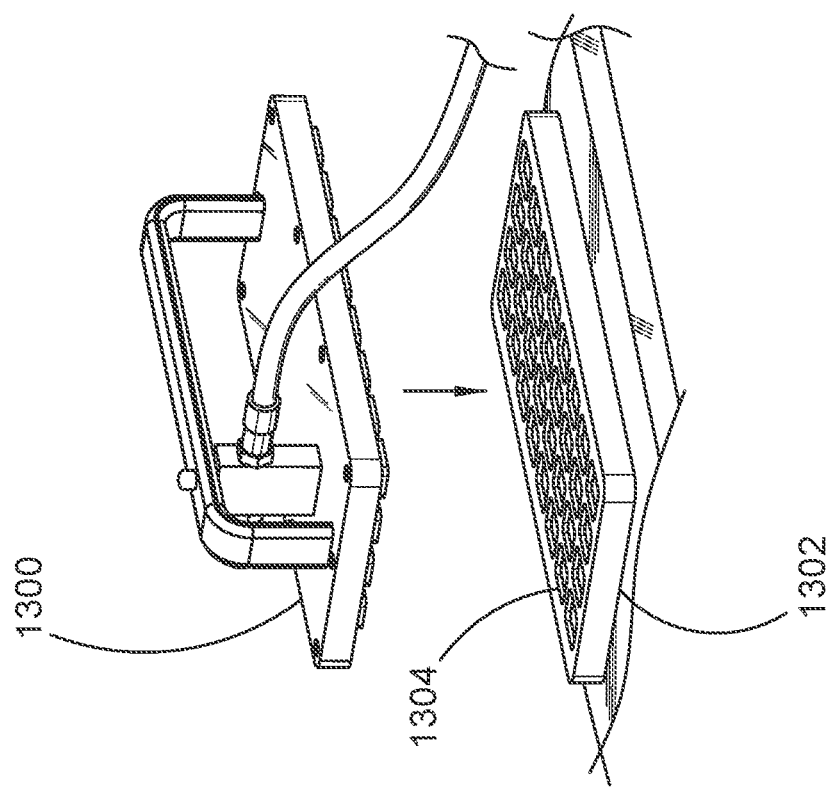
Figures 13C, 13D:
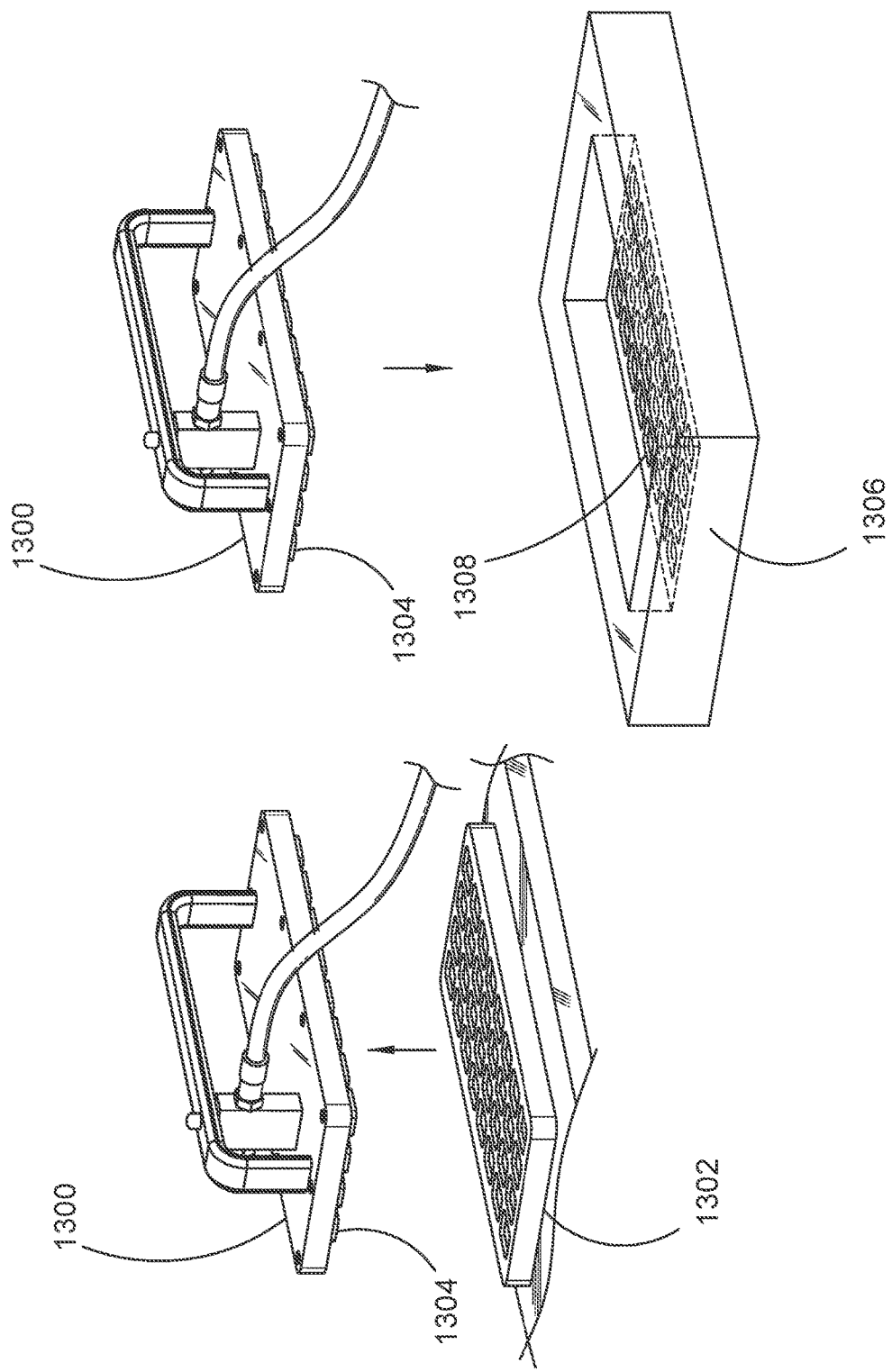
Figure 13F:
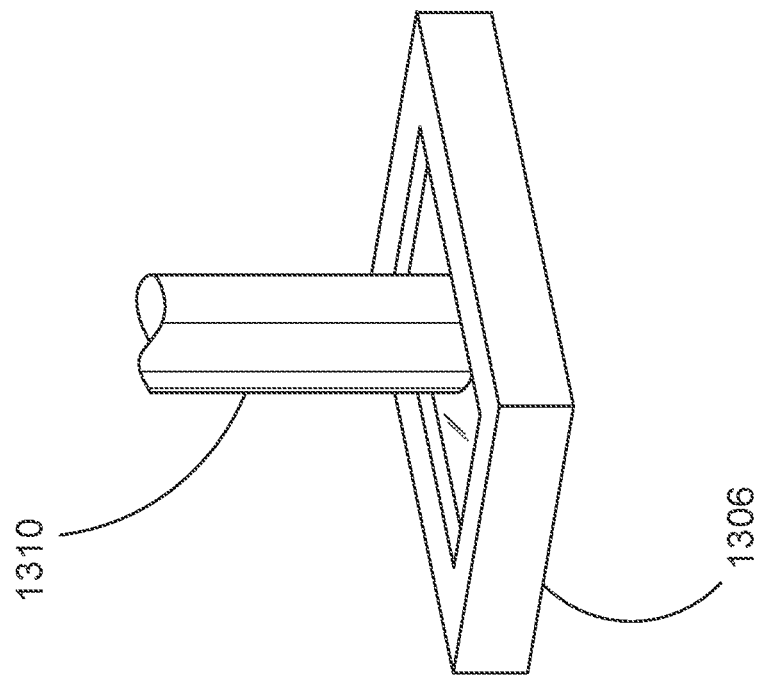
Figure 13E:
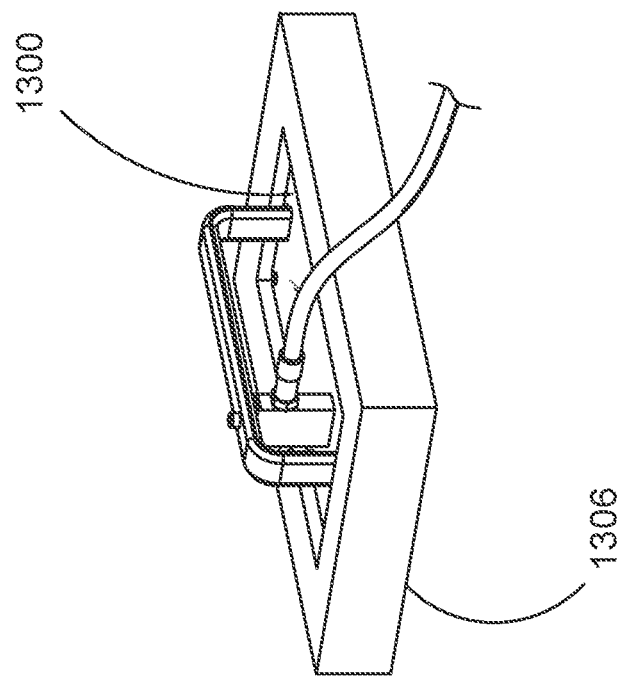

FIGS. 13A-13F and FIG. 14 illustrate the method 1400 of loading pans into a press using the inventive pan insertion tool. Beginning at step 1402 the operator first decides on which interface plate to use, based on the pan size and shape being filled and pressed. For each pan insertion tool that can be as many different interface plates as there are pan configurations. Each one of the different interface plates mates with the control plate to form an airtight seal around a cavity or series of passageways between the interface plate and the control plate. A gasket can be used between the interface plate and the control plate to create the airtight seal. In step 1404 the selected interface plate is attached to the control plate and in step 1406 the vacuum hose is attached to the valve of the tool. In step 1408 a plurality of pans can be loaded into a pickup fixture, as shown in FIG. 13A; pans 1304 are loaded into a pickup fixture 1302. The pickup fixture 1302 holds the pans in specific locations relative to each other. In step 1410 the tool 1300 is lowered into the pans 1304, which is shown in FIG. 13B. In step 1412 the valve is opened, creating a suction at each protrusion site of the tool, holding the respective pan by suction force to its protrusion site. In step 1414, with the valve still open, the tool 1300 is removed from the pickup fixture 1302, and the pans 1304 are removed with the tool as shown in FIG. 13C. In step 1416 the tool 1300 with the pans 1304 is lowered into a press base 1306, as shown in FIGS. 13D-13E. The press base 1306 includes a fixture 1308 for receiving the pans 1304. In step 1418, with the tool 1300 in the press base 1306, the valve is then closed, removing suction from the pans, allowing them to remain in the press base 1306 in their respective locations, and the tool can be removed. In step 1420 the pans are filled with powder. The powder is then levelled off and excess powder is removed from around the pans, leaving the pans filled with uncompressed powder. In step 1422, as shown in FIG. 13F, the press head 1310 is applied to compress the powder in each pan. In step 1424 the pans, containing compressed powder, are removed from the press base, and then assembled into, for example, cosmetics containers.

A pan insertion tool has been disclosed the provides the benefit of eliminating a series of tedious manual operations in the loading of pans into a powder press for cosmetics containers. Conventionally, each pan is loaded into the press individually by hand. This conventional process is a gating process in the production of cosmetics packaging, and furthermore, often results in minor injuries due to cuts from the edges of the pans. The disclosed pan insertion tool is operable to pick up a plurality of pans together, at once, and move them in unison into the press. Furthermore, the tool is reconfigurable by separating the control section from the interface section, which allows multiple different interface sections to be used with the same control section. Thus, an assembly line can manufacture a run of pans of a first size and shape, using a first interface section on the tool. Then a second run of pans of a different size or shape can be processed by swapping out the interface section for another interface section that corresponds to the pans of the second run.

What is claimed is:

1. A multi-pan insertion tool, comprising:
 a control plate having a first major side and a second major side, the second major side being opposite the first major side and the first major side having a handle mounted thereon, an air channel formed through the control plate from the first major side to the second major side;
 an interface plate having a first major side and a second major side, the second major side defining a cavity, the first major side comprising a plurality of protrusion sites, each one of the plurality of protrusion sites being configured to fit into a respective pan and hold the respective pan by suction;
 wherein the interface plate is coupled to the control plate such that the second major side of the interface plate faces the second major side of the control plate and forms an airtight seal between the interface plate and the control plate;
 each one of the plurality of protrusion sites includes a pair of guide protrusions, each guide protrusion of the pair of guide protrusions extend perpendicularly from the first major side of the interface plate a first distance to a bottom, and has an outer vertical surface that faces away from the other guide protrusion of the pair of guide protrusions, and further has side vertical surfaces on opposing sides of the guide protrusion that extend to the bottom, wherein the side vertical surfaces each meet the outer vertical surface and bottom at opposing corners that are rounded, wherein a lower outer edge between the opposing corners where the bottom meets the outer vertical surface is rounded,
 each one of the plurality of protrusion sites further including a suction cup fitting positioned on the first major side of the interface plate between each of the guide protrusions that has a resilient suction cup at a bottom of the suction cup fitting and a passage through the suction cup fitting that is communication with the cavity between the control plate and the interface plate, wherein a bottom of the resilient suction cup is further from the interface plate then the bottom of each of the pair of guide protrusions; and
 an air valve coupled to the air channel on the first major side of the control plate, the air valve having an actuator configured to operate the air valve to thereby allow or disallow air to flow through the air channel.

2. The multi-pan insertion tool of claim 1, further comprising a gasket between the control plate and the interface plate.

3. The multi-pan insertion tool of claim 1, wherein the actuator is disposed on the handle.

4. The multi-pan insertion tool of claim 1, wherein the control plate defines a cavity at the second major side that is contiguous with the cavity of the interface plate when the control plate and interface plate are coupled together.

5. The multi-pan insertion tool of claim 1, wherein each one of the plurality of protrusion sites has a perimeter that matches a shape of a specific pan design.

6. The multi-pan insertion tool of claim 1, wherein the control plate and the interface plate each comprise a plurality of corresponding holes, each hole being configured to receive a threaded fastener to join the control plate to the interface plate, and wherein the plurality of corresponding holes of one of the control plate or the interface plate are each threaded.

7. The multi-pan insertion tool of claim 1, wherein each one of the plurality of protrusion sites further includes a connector boss disposed on the first major surface of the interface plate between the guide protrusions, the suction cup fitting has a top that is threaded into the connector boss.

8. A multi-pan insertion tool, comprising:
 a body having a handle on a top portion of the body and a plurality of protrusion sites on a bottom of the body, each one of the plurality of protrusion sites being configured to fit into a respective pan and hold the respective pan by suction on a bottom of the body, each one of the plurality of protrusion sites having an air channel coupled to a common air channel inside the body;
 each one of the plurality of protrusion sites includes a pair of guide protrusions, each guide protrusion of the pair of guide protrusions extend perpendicularly from the first major side of the interface plate a first distance to a bottom, and has an outer vertical surface that faces away from the other guide protrusion of the pair of guide protrusions, and further has side vertical surfaces on opposing sides of the guide protrusion that extend to the bottom, wherein the side vertical surfaces each meet the outer vertical surface and bottom at opposing corners that are rounded, wherein a lower outer edge between the opposing corners where the bottom meets the outer vertical surface is rounded,
 each one of the plurality of protrusion sites further including a suction cup fitting positioned on the first major side of the interface plate between each of the guide protrusions that has a resilient suction cup at a bottom of the suction cup fitting and a passage through the suction cup fitting that is communication with the common air channel, wherein a bottom of the resilient suction cup is further from the interface plate then the bottom of each of the pair of guide protrusions;
 a valve coupled to the body and having an air channel in communication with common air channel inside the body; and
 an actuator disposed on the body that controls the valve and is operable to selectively and alternatively open and close the valve.

9. The multi-pan insertion tool of claim 8, wherein the body comprises a control plate on which the handle is mounted, and an interface plate on which the plurality of protrusion sites is formed, and wherein the body further includes a gasket between the control plate and the interface plate.

10. The multi-pan insertion tool of claim 9, wherein the control plate and the interface plate each comprise a plurality of corresponding holes, each hole being configured to receive a threaded fastener to join the control plate to the interface plate.

11. The multi-pan insertion tool of claim 8, wherein the actuator is disposed on the handle.

12. The multi-pan insertion tool of claim 8, wherein each one of the plurality of protrusion sites has a perimeter that matches a shape of a specific pan design.

13. The multi-pan insertion tool of claim 8, wherein each one of the plurality of protrusion sites further includes a connector boss disposed on the first major surface of the interface plate between the guide protrusions, the suction cup fitting has a top that is threaded into the connector boss.

\* \* \* \* \*